(12) United States Patent
Kitagawa et al.

(10) Patent No.: US 11,946,150 B2
(45) Date of Patent: Apr. 2, 2024

(54) ELECTROCHEMICAL REACTION DEVICE

(71) Applicant: KABUSHIKI KAISHA TOSHIBA, Tokyo (JP)

(72) Inventors: Ryota Kitagawa, Setagaya (JP); Asahi Motoshige, Ota (JP); Yoshitsune Sugano, Kawasaki (JP); Masakazu Yamagiwa, Yokohama (JP); Jun Tamura, Chuo (JP); Yuki Kudo, Yokohama (JP); Akihiko Ono, Kita (JP); Satoshi Mikoshiba, Yamato (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 110 days.

(21) Appl. No.: 17/881,114

(22) Filed: Aug. 4, 2022

(65) Prior Publication Data

US 2022/0380916 A1     Dec. 1, 2022

Related U.S. Application Data

(63) Continuation of application No. 16/295,227, filed on Mar. 7, 2019, now abandoned.

(30) Foreign Application Priority Data

Sep. 19, 2018  (JP) .................................. 2018-175169

(51) Int. Cl.
  *C25B 15/02* (2021.01)
  *C25B 3/25* (2021.01)
  *C25B 9/19* (2021.01)

(52) U.S. Cl.
  CPC ................ *C25B 15/02* (2013.01); *C25B 3/25* (2021.01); *C25B 9/19* (2021.01)

(58) Field of Classification Search
  CPC .............. C25B 3/25; C25B 9/19; C25B 15/02
  See application file for complete search history.

(56) References Cited

U.S. PATENT DOCUMENTS

| 6,296,755 B1 | 10/2001 | Wang et al. |
| 2004/0007476 A1 | 1/2004 | Tennakoon |

(Continued)

FOREIGN PATENT DOCUMENTS

| EP | 3 375 907 A1 | 9/2018 |
| JP | 2002-541327 | 12/2002 |

(Continued)

OTHER PUBLICATIONS

Oloman, C., et al. "Electrochemical Processing of Carbon Dioxide", ChemSusChem 2008, 1, pp. 385-391.

*Primary Examiner* — Ciel P Contreras
(74) *Attorney, Agent, or Firm* — Oblon, McClelland, Maier & Neustadt, L.L.P.

(57) ABSTRACT

An electrochemical reaction device in an embodiment includes: a reaction unit including a first accommodation part to accommodate carbon dioxide and a second accommodation part to accommodate an electrolytic solution containing water; a reduction electrode to reduce the carbon dioxide; an oxidation electrode to oxidize the water; a power supply to pass current between the reduction electrode and the oxidation electrode; a pressure regulator to regulate a pressure in the first accommodation part; a reaction product detector to detect at least one of an amount and a kind of a substance produced at the reduction electrode; and a controller to control the pressure regulator based on a detection signal of the reaction product detector.

10 Claims, 5 Drawing Sheets

(56) References Cited

U.S. PATENT DOCUMENTS

| | | |
|---|---|---|
| 2008/0223727 A1 | 9/2008 | Oloman |
| 2011/0114602 A1 | 5/2011 | Cole et al. |
| 2013/0186771 A1 | 7/2013 | Zhar et al. |
| 2014/0291162 A1 | 10/2014 | Sala et al. |
| 2015/0038741 A1 | 2/2015 | Pedersen |
| 2015/0096897 A1 | 4/2015 | Hashiba |
| 2016/0017503 A1 | 1/2016 | Kaczur |
| 2017/0167038 A1 | 6/2017 | Hashiba |
| 2017/0175277 A1 | 8/2017 | von Olshausen |
| 2018/0216243 A1 | 8/2018 | Kudo et al. |
| 2018/0265440 A1 | 9/2018 | Kudo et al. |
| 2019/0055656 A1 | 2/2019 | Kenis |

FOREIGN PATENT DOCUMENTS

| | | |
|---|---|---|
| JP | 2011-174139 | 9/2011 |
| JP | 2013-536319 | 9/2013 |
| JP | 2014-167151 | 9/2014 |
| JP | 2014-528519 | 10/2014 |
| JP | 2018-070938 | 5/2018 |
| JP | 2018-123390 | 8/2018 |
| WO | WO 2013/157097 A1 | 10/2013 |
| WO | WO 2018/181004 A1 | 9/2018 |
| WO | WO 2019/181002 A1 | 9/2019 |
| WO | WO 2019/181003 A1 | 9/2019 |

ELECTROCHEMICAL REACTION DEVICE

CROSS REFERENCE TO RELATED APPLICATION

This application is a continuation of and claims benefit under 35 U.S.C. § 120 to U.S. application Ser. No. 16/295,227, filed Mar. 7, 2019, which is based upon and claims the benefit of priority under 35 U.S.C. § 119 to Japanese Patent Application No. 2018-175169, filed on Sep. 19, 2018, the entire contents of each of which are incorporated herein by reference.

FIELD

Embodiments described herein relate generally to an electrochemical reaction device.

BACKGROUND

In recent years, there is a concern over depletion of fossil fuel resources such as petroleum and coal, and expectations of sustainable renewable energy increases. From the viewpoint of such energy problems, environmental problems and so on, an artificial photosynthesis technology is under development which electrochemically reduces carbon dioxide using renewable energy of sunlight or the like to generate a stockable chemical energy source. An electrochemical reaction device realizing the artificial photosynthesis technology includes, for example, an oxidation electrode that oxidizes water ($H_2O$) to produce oxygen ($O_2$), and a reduction electrode that reduces carbon dioxide ($CO_2$) to produce a carbon compound. The oxidation reaction electrode and the reduction electrode of the electrochemical reaction device are generally connected to a power supply derived from renewable energy such as solar power generation, hydroelectric power generation, wind power generation, geothermal power generation or the like.

The reduction electrode of the electrochemical reaction device is arranged, for example, to be immersed in water in which $CO_2$ is dissolved or to be in contact with water which flows through a flow path and in which $CO_2$ is dissolved. The reduction electrode obtains reduction potential for $CO_2$ from the power supply derived from renewable energy and thereby reduces $CO_2$ to produce carbon compounds such as carbon monoxide (CO), formic acid (HCOOH), methanol ($CH_3OH$), methane ($CH_4$), ethanol ($C_2H_5OH$), ethane ($C_2H_6$), ethylene ($C_2H_4$), ethylene glycol ($C_2H_6O_2$) and the like.

A problem in the case of electrochemically reducing $CO_2$ using the above-described renewable energy is that power is likely to fluctuate due to the change in weather, wind condition or the like and the applied voltage to the reduction electrode is likely to fluctuate accompanying the change. The change in the applied voltage to the reduction electrode causes successive fluctuations in production amount and composition of a reduction product of $CO_2$ to be obtained. This becomes a factor to decrease the availability and utility value of the reduction product of $CO_2$. As a method to solve the problem, a potentiostat capable of applying a constant potential to the reduction electrode to operate (three-electrode system) the electrochemical reaction device is experimentally performed, but this loses the advantages owing to the utilization of the renewable energy and results in a problem in terms of cost and efficiency.

DETAILED DESCRIPTION

An electrochemical reaction device in an embodiment includes: a reaction unit including a first accommodation part configured to accommodate carbon dioxide, a second accommodation part configured to accommodate an electrolytic solution containing water, and a diaphragm provided between the first accommodation part and the second accommodation part; a reduction electrode configured to reduce the carbon dioxide; an oxidation electrode configured to oxidize the water; a pressure regulator configured to regulate a pressure in the first accommodation part; a reaction product detector configured to detect at least one of an amount and a kind of a substance produced at the reduction electrode; and a controller configured to control the pressure regulator based on a detection signal of the reaction product detector.

Electrochemical reaction devices in embodiments will be described hereinafter with reference to the drawings. Substantially the same components are denoted by the same reference signs and description thereof may be omitted in some cases in the embodiments described below. The drawings are schematic, and the relation between thicknesses and plane dimensions, ratios between the thicknesses of the parts and the like may differ from actual ones.

First Embodiment

Figure 1:
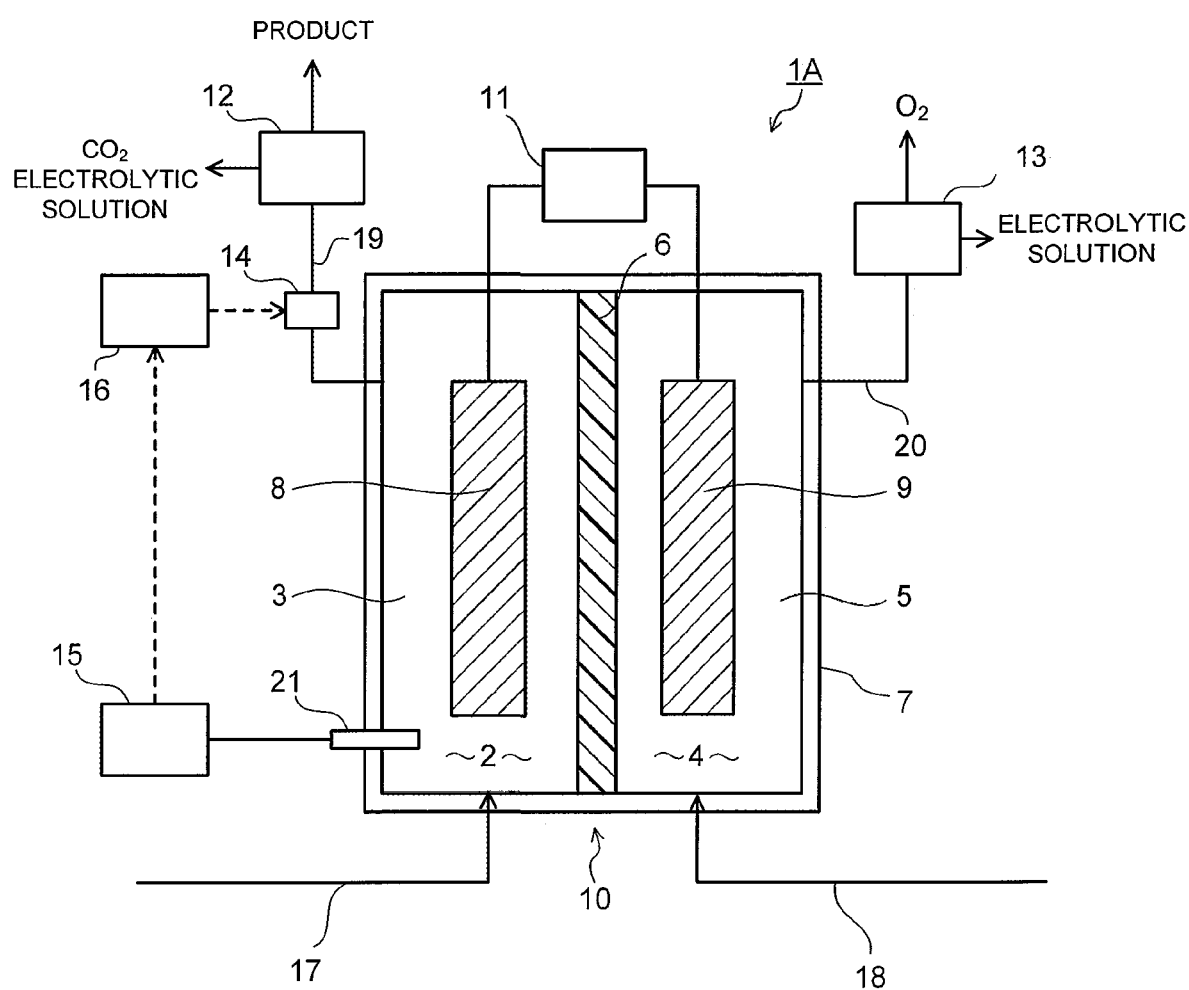
FIG. 1 is a diagram illustrating an electrochemical reaction device in a first embodiment.

FIG. 1 is a view illustrating an electrochemical reaction device 1 in a first embodiment. An electrochemical reaction device 1A illustrated in FIG. 1 includes: an electrochemical reaction cell 10 including a reaction vessel 7 including a first accommodation part 3 configured to accommodate a first electrolytic solution 2 containing $CO_2$, a second accommodation part 5 configured to accommodate a second electrolytic solution 4 containing water, and a diaphragm 6, a reduction electrode (cathode) 8 arranged in the first accommodation part 3, and an oxidation electrode (anode) 9 arranged in the second accommodation part 5; a power supply 11 connected to the reduction electrode 8 and the oxidation electrode 9; a first product separator 12 configured to separate a reduction reaction product produced in the first accommodation part 3 from the first electrolytic solution 2; a second product separator 13 configured to separate an oxidation reaction product produced in the second accommodation part 5 from the second electrolytic solution 4; a pressure regulator 14 configured to regulate a pressure in the first accommodation part 3; a reaction product detector 15 configured to detect at least one of an amount and a kind of a substance produced at the reduction electrode 8; and a controller 16 configured to control the pressure regulator 14 based on a detection signal of the reaction product detector 15. Hereinafter, the units and so on will be described in detail.

The reaction vessel 7 is separated into two chambers by the diaphragm 6 capable of moving ions such as hydrogen ions ($H^+$) and hydroxide ions ($OH^-$) and the like, and has the first accommodation part 3 and the second accommodation part 5. The reaction vessel 7 may be made of, for example, quartz white plate glass, polystyrol, polymethacrylate or the like. A material transmitting light may be used for a part of the reaction vessel 7, and a resin material may be used for the remainder. Examples of the resin material include polyetheretherketone (PEEK), polyamide (PA), polyvinylidene fluoride (PVDF), polyacetal (POM) (copolymer), polyphenyleneether (PPE), acrylonitrile-butadiene-styrene copolymer (ABS), polypropylene (PP), polyethylene (PE) and so on.

In the first accommodation part 3, the reduction electrode 8 is arranged and the first electrolytic solution 2 is accommodated. The first electrolytic solution 2 functions as a reduction electrode solution (cathode solution) and contains carbon dioxide ($CO_2$) as a substance to be reduced. The first electrolytic solution 2 may contain hydrogen ions and is preferably an aqueous solution. In the second accommodation part 5, the oxidation electrode 9 is arranged and the second electrolytic solution 4 is accommodated. The second electrolytic solution 4 functions as an oxidation electrode solution (anode solution) and contains water ($H_2O$) as a substance to be oxidized. The second electrolytic solution 4 may be an alcohol aqueous solution, an aqueous solution of an organic substance such as amine or the like.

It is possible to change the amount of water and electrolytic solution components contained in the first and second electrolytic solutions 2, 4 to change the reactivity so as to change the selectivity of the substance to be reduced and the proportion of the chemical substance. The first and second electrolytic solutions 2, 4 may contain redox couples as needed. Examples of the redox couple include $Fe^{3+}/Fe^{2-}$ and $IO^{3-}/I^{31}$. The first and second accommodation parts 3, 5 may include space parts for accommodating gas contained in the reactant and the product. To the first accommodation part 3, a first liquid supply flow path 17 for supplying the first electrolytic solution 2 is connected, and the first product separator 12 is connected through a first gas and liquid discharge flow path 19. To the second accommodation part 5, a second liquid supply flow path 18 for supplying the second electrolytic solution 4 is connected, and the second product separator 13 is connected through a second gas and liquid discharge flow path 20.

The first electrolytic solution 2 and the second electrolytic solution 4 may be electrolytic solutions containing different substances or may be electrolytic solutions containing the same substance. In the case where the first electrolytic solution 2 and the second electrolytic solution 4 contain the same substance and the same solvent, the first electrolytic solution 2 and the second electrolytic solution 4 may be regarded as one electrolytic solution. Besides, the pH of the second electrolytic solution 4 is preferably higher than the pH of the first electrolytic solution 2. This makes the hydrogen ions, the hydroxide ions and so on easy to move. Further, the liquid junction potential due to the difference in pH can effectively promote the oxidation-reduction reaction.

The first electrolytic solution 2 is preferably a solution with high absorptance of $CO_2$. The existing form of $CO_2$ in the first electrolytic solution 2 is not always limited to a state of being dissolved therein, but $CO_2$ in an air bubble state may exist to be mixed in the first electrolytic solution 2. Examples of the electrolytic solution containing carbon dioxide include aqueous solutions containing hydrogencarbonates and carbonates such as lithium hydrogen carbonate ($LiHCO_3$), sodium hydrogen carbonate ($NaHCO_3$), potassium hydrogen carbonate ($KHCO_3$), sodium carbonate ($Na_2CO_3$), potassium carbonate ($K_2CO_3$), and cesium hydrogen carbonate ($CsHCO_3$), phosphoric acid, boric acid, and so on. The electrolytic solution containing carbon dioxide may contain alcohols such as methanol, ethanol, acetone and the like, or may be an alcohol solution. The first electrolytic solution 2 may be an electrolytic solution containing a $CO_2$ absorbent that lowers the reduction potential for $CO_2$, has high ion conductivity, and absorbs $CO_2$.

As the second electrolytic solution 4, a solution containing water ($H_2O$), for example, an aqueous solution containing an arbitrary electrolyte may be used. The solution is preferably an aqueous solution that promotes the oxidation reaction of water. Examples of the aqueous solution containing the electrolyte include aqueous solutions containing phosphate ion ($PO_4^{2-}$), borate ion ($BO_3^{3-}$), sodium ion ($Na^+$), potassium ion ($K^+$), calcium ion ($Ca_2^+$), lithium ion ($Li^+$), cesium ion ($Cs^+$), magnesium ion ($Mg^{2+}$), chloride ion ($Cl^-$), hydrogen carbonate ion ($HCO_2^-$), carbonate ion ($CO_3^-$), hydroxide ion ($OH^-$) and the like.

As the above-described electrolytic solutions 2, 4, for example, ionic liquids made of salts of cations such as imidazolium ions or pyridinium ions and anions such as $BF_4^-$ or $PF_6^-$ and in a liquid state in a wide temperature range, or aqueous solutions thereof may be used. Examples of other electrolytic solutions include amine solutions such as ethanolamine, imidazole, and pyridine, and aqueous solutions thereof. Examples of amine include primary amine, secondary amine, and tertiary amine. The electrolytic solutions may be high in ion conductivity and have properties of absorbing carbon dioxide and characteristics of lowering the reduction energy.

Examples of the primary amine include methylamine, ethylamine, propylamine, butylamine, pentylamine, hexylamine and the like. Hydrocarbons of the amine may be substituted by alcohol, halogen and the like. Examples of amine whose hydrocarbons are substituted include methanolamine, ethanolamine, chloromethylamine and the like. Further, an unsaturated bond may exist. These hydrocarbons are also the same in the secondary amine and the tertiary amine.

Examples of the secondary amine include dimethylamine, diethylamine, dipropylamine, dibutylamine, dipentylamine, dihexylamine, dimethanolamine, diethanolamine, dipropanolamine and the like. The substituted hydrocarbons may be different. This also applies to the tertiary amine. Examples with different hydrocarbons include methylethylamine, methylpropylamine and the like.

Examples of the tertiary amine include trimethylamine, triethylamine, tripropylamine, tributylamine, trihexylamine, trimethanolamine, triethanolamine, tripropanolamine, tributanolamine, tripropanolamine, triexanolamine, methyldiethylamine, methyldipropylamine and the like.

Examples of the cation of the ionic liquid include 1-ethyl-3-methylimidazolium ion, 1-methyl-3-propylimidazolium ion, 1-butyl-3-methylimidazole ion, 1-methyl-3-pentylimidazolium ion, 1-hexyl-3-methylimidazolium ion and the like.

A second place of the imidazolium ion may be substituted. Examples of the cation of the imidazolium ion whose second place is substituted include 1-ethyl-2,3-dimethylimidazolium ion, 1,2-dimethyl-3-propylimidazolium ion, 1-butyl-2, 3-dimethylimidazolium ion, 1,2-dimethyl-3-pentylimidazolium ion, 1-hexyl-2,3-dimethylimidazolium ion and the like.

Examples of the pyridinium ion include methylpyridinium, ethylpyridinium, propylpyridinium, butylpyridinium, pentylpyridinium, hexylpyridinium and the like. In both of the imidazolium ion and the pyridinium ion, an alkyl group may be substituted, or an unsaturated bond may exist.

Examples of the anion include fluoride ion ($F^-$), chloride ion ($Cl^-$), bromide ion ($Br^-$), iodide ion ($I^-$), $BF_4^-$, $PF_6^-$, $CF_3COO^{31}$, $CF_3SO_3^-$, $NO_3^-$, $SCN^-$, $(CF_3SO_2)_3C^-$, bis(trifluoromethoxysulfonyl)imide, bis(perfluoroethylsulfonyl)imide and the like. Dipolar ions in which the cations and the anions of the ionic liquid are coupled by hydrocarbons may be used. Note that a buffer solution such as a potassium phosphate solution may be supplied to the accommodation parts 3, 5.

For the diaphragm 6, a membrane capable of selectively allowing the anion or the cation to pass therethrough is used. This makes it possible to make the electrolytic solutions 2, 4 in contact with the reduction electrode 8 and the oxidation electrode 9 respectively electrolytic solutions containing different substances, and to promote the reduction reaction and the oxidation reaction depending on the difference in ionic strength, the difference in pH or the like. The diaphragm 6 can be used to separate the first electrolytic solution 2 from the second electrolytic solution 4. The diaphragm 6 may have a function of allowing part of ions contained in the electrolytic solutions 2, 4 in which both the electrodes 8, 9 are immersed, namely, a function of blocking one or more kinds of ions contained in the electrolytic solutions 2, 4. This can differ, for example, the pH between the two electrolytic solutions 2, 4.

As the diaphragm 6, an ion exchange membrane such as NEOSEPTA (registered trademark) of ASTOM Corporation, Selemion (registered trademark), Aciplex (registered trademark) of ASAHI GLASS CO., LTD., Fumasep (registered trademark), fumapem (registered trademark) of Fumatech GmbH, Nafion (registered trademark) being fluorocarbon resin made by sulfonating and polymerizing tetrafluoroethylene of E.I. du Pont de Nemours and Company, lewabrane (registered trademark) of LANXESS AG, IONSEP (registered trademark) of IONTECH Inc., Mustang (registered trademark) of PALL Corporation, ralex (registered trademark) of mega Corporation, Gore-Tex (registered trademark) of Gore-Tex Co., Ltd. or the like can be used. Besides, the ion exchange membrane may be composed using a membrane having hydrocarbon as a basic skeleton or a membrane having an amine group in anion exchange. When the first electrolytic solution 2 and the second electrolytic solution 4 are different in pH, the electrolytic solutions can be used while stably keeping their pHs by using a bipolar membrane made by stacking a cation exchange membrane and an anion exchange membrane.

Other than the ion exchange membrane, for example, porous membranes of a silicone resin, fluorine-based resins (perfluoroalkoxyalkane (PFA), perfluoroethylene propene copolymer (FEP), polytetrafluoroethylene (PTFE), ethylene-tetrafluoroethylene copolymer (ETFE), polyvinylidene fluoride (PVDF), polychlorotrifluoroethylene (PCTFE), ethylene-chlorotrifluoroethylene copolymer (ECTFE) and the like), and ceramics, packing filled with glass filter, agar and the like, insulating porous bodies of zeolite and oxide and the like may be used as the diaphragm 6. In particular, a hydrophilic porous membrane never causes clogging due to air bubbles and is thus preferable as the diaphragm 6.

The reduction electrode 8 is an electrode (cathode) that reduces carbon dioxide ($CO_2$) to produce a carbon compound. The reduction electrode 8 is arranged in the first accommodation part 3 and immersed in the first electrolytic solution 2. The reduction electrode 8 contains, for example, a reduction catalyst for producing the carbon compound by the reduction reaction of carbon dioxide. Examples of the reduction catalyst include a material that lowers activation energy for reducing carbon dioxide. In other words, a material that lowers an overvoltage when the carbon compound is produced by the reduction reaction of carbon dioxide can be exemplified.

For example, a metal material or a carbon material can be used as the reduction electrode 8. As the metal material, for example, a metal such as gold, aluminum, copper, silver, platinum, palladium, zinc, mercury, indium, or nickel, or an alloy containing the metal can be used. As the carbon material, for example, graphene, carbon nanotube (CNT), fullerene, ketjen black or the like can be used. Note that the reduction catalyst is not limited to the above but, for example, a metal complex such as a Ru complex or a Re complex, or an organic molecule having an imidazole skeleton or a pyridine skeleton may be used as the reduction catalyst. The reduction catalyst may be a mixture of a plurality of materials. The reduction electrode 8 may have, for example, a structure having the reduction catalyst in a thin film shape, a mesh shape, a particle shape, a wire shape or the like provided on a conductive substrate.

Examples of the carbon compound produced by the reduction reaction at the reduction electrode 8 include carbon monoxide (CO), formic acid (HCOOH), methane ($CH_4$), methanol ($CH_3OH$), ethane ($C_2H_6$), ethylene ($C_2H_4$), ethanol ($C_2H_5OH$), formaldehyde (HCHO), ethylene glycol ($C_2H_6O_2$) and so on though different depending on the kind or the like of the reduction catalyst. Further, at the reduction electrode 8, a side reaction of producing hydrogen ($H_2$) by the reduction reaction of water ($H_2O$) may occur at the same time with the reduction reaction of carbon dioxide ($CO_2$).

The oxidation electrode 9 is an electrode (anode) that oxidizes water ($H_2O$) to produce oxygen. The oxidation electrode 9 is arranged in the second accommodation part 5 and immersed in the second electrolytic solution 4. The oxidation electrode 9 contains an oxidation catalyst for $H_2O$ as a substance to be oxidized. As the oxidation catalyst, a material that lowers activation energy for oxidizing $H_2O$, in other words, a material that lowers an overvoltage when oxygen and hydrogen ions are produced by the oxidation reaction of $H_2O$ is used.

Examples of the oxidation catalyst material include metals such as ruthenium, iridium, platinum, cobalt, nickel, iron, manganese and the like. Further, a binary metal oxide, a ternary metal oxide, a quaternary metal oxide or the like can be used. Examples of the binary metal oxide include manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O) and the like. Examples of the ternary metal oxide include Ni—Fe—O, Ni—Co—O, La—Co—O, Ni—La—O, Sr—Fe—O and the like. Examples of the quaternary metal oxide include Pb—Ru—Ir—O, La—Sr—Co—O and the like. Note that the oxidation catalyst is not limited to the above, but a metal hydroxide containing cobalt, nickel, iron, manganese or the like, or a metal complex such as a Ru complex or a Fe complex may be used as the oxidation catalyst. Further, a plurality of materials may be mixed together for use.

Further, the oxidation electrode 9 may be composed of a composite material containing both the oxidation catalyst and a conductive material. Examples of the conductive material include: carbon materials such as carbon black, activated carbon, fullerene, carbon nanotube, graphene, ketjen black, diamond and the like; transparent conductive oxides such as indium tin oxide (ITO), zinc oxide (ZnO), fluorine-doped tin oxide (FTO), aluminum-doped zinc oxide (AZO), antimony-doped tin oxide (ATO) and the like; metals such as Cu, Al, Ti, Ni, Ag, W, Co, Au and the like; and alloys each containing at least one of the metals. The oxidation electrode 9 may have a structure having the oxidation catalyst in a thin film shape, a mesh shape, a particle shape, a wire shape or the like provided on a conductive substrate. As the conductive substrate, for example, a metal material containing titanium, titanium alloy, or stainless steel is used.

The power supply 11 is to supply power to make the electrochemical reaction cell 10 cause the oxidation-reduction reaction, and is electrically connected to the reduction electrode 8 and the oxidation electrode 9. The electric energy supplied from the power supply 11 is used to cause the reduction reaction by the reduction electrode 8 and the oxidation reaction by the oxidation electrode 9. The power supply 11 and the reduction electrode 8 are connected and the power supply 11 and the oxidation electrode 9 are connected, for example, by wiring. Between the electrochemical reaction cell 10 and the power supply 11, electric equipment such as an inverter, a converter, a battery and so on may be installed as needed. The drive system of the electrochemical reaction cell 10 may be a constant-voltage system or may be a constant-current system.

The power supply 11 may be the commercial power supply, a battery or the like, or may be a power supply that supplies electric energy obtained by converting renewable energy. Examples of the power supply include a power supply that converts kinetic energy or potential energy such as wind power, water power, geothermal power, tidal power or the like to electric energy, a power supply such as a solar cell including a photoelectric conversion element that converts light energy to electric energy, a power supply such as a fuel cell or a storage battery that converts chemical energy to electric energy, an apparatus that converts vibrational energy such as sound to electric energy, and so on. The photoelectric conversion element has a function of performing charge separation by emitted light energy of sunlight or the like. Examples of the photoelectric conversion element include a pin-junction solar cell, a pn-junction solar cell, an amorphous silicon solar cell, a multijunction solar cell, a single crystal silicon solar cell, a polycrystalline silicon solar cell, a dye-sensitized solar cell, an organic thin-film solar cell, and the like. The photoelectric conversion element may be stacked on at least one of the reduction electrode 8 and the oxidation electrode 9 inside the reaction vessel 7.

The reduction reaction product produced at the reduction electrode 8 is sent through the first gas and liquid discharge flow path 19 to the first product separator 12. In the first product separator 12, carbon monoxide (CO) being a gaseous product, or formic acid (HCOOH), methane ($CH_4$), methanol ($CH_3OH$), ethane ($C_2H_6$), ethylene ($C_2H_4$), ethanol ($C_2H_5OH$), formaldehyde (HCHO), ethylene glycol ($C_2H_6O_2$) or the like being a liquid product is separated from the first electrolytic solution 2. When the reduction reaction of water ($H_2O$) being the side reaction of the reduction reaction of carbon dioxide ($CO_2$) occurs, hydrogen ($H_2$) produced therefrom is also separated from the first electrolytic solution 2. Further, the oxidation reaction product produced at the oxidation electrode 9 is sent through the second gas and liquid discharge flow path 20 to the second product separator 13. In the second product separator 13, oxygen ($O_2$) being a gaseous product is mainly separated from the second electrolytic solution 4.

The first gas and liquid discharge flow path 19 is provided with the pressure regulator 14 that regulates the pressure in the first accommodation part 3. The pressure regulator 14 is arranged on the back pressure side of the first accommodation part 3. As the pressure regulator 14, for example, a variable throttle, a flow rate control valve or the like is used. More specifically, the flow rate of fluid (fluid including gas and liquid) flowing through the first gas and liquid discharge flow path 19 can be controlled to regulate the pressure in the first accommodation part 3. The pressure in the first accommodation part 3 is preferably set to a pressure which does not liquefy $CO_2$, and is concretely regulated in a range of 0.1 MPa or more and 6.4 MPa or less. If the pressure in the first accommodation part 3 is less than 0.1 MPa, the reduction reaction efficiency of $CO_2$ may decrease. If the pressure in the first accommodation part 3 exceeds 6.4 MPa, $CO_2$ is liquefied and the reduction reaction efficiency of $CO_2$ may decrease.

Increasing or decreasing the pressure in the first accommodation part 3 can control the amount and kind of the reduction reaction product to be produced at the reduction electrode 8. In other words, regulating the pressure in the first accommodation part 3 to change the partial pressure of $CO_2$ being reacting species, thereby enabling regulation of the $CO_2$ amount near the reduction electrode 8. This can control the reduction potential of the reduction electrode 8. As will be described below in detail, also in the case where the applied voltage to the reduction electrode 8 from the power supply 11 fluctuates, the reduction potential of the reduction electrode 8 can be adjusted to a predetermined value. Accordingly, the fluctuation in the production amount and the composition of the reduction reaction product accompanying the fluctuation in the applied voltage to the reduction electrode 8 is suppressed to enable stabilization of the production amount and the composition of the reduction reaction product.

Figure 2:
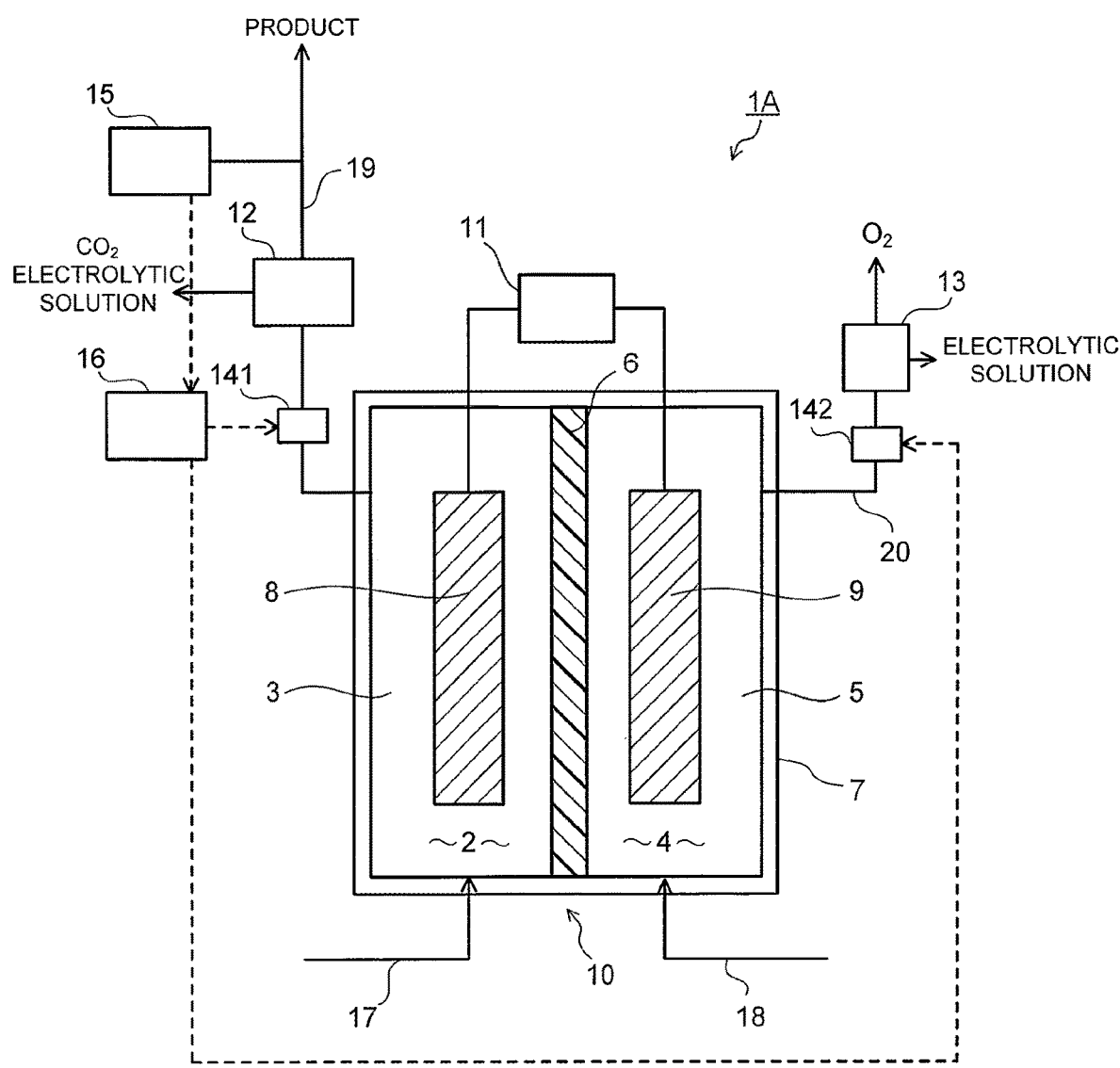
FIG. 2 is a diagram illustrating a modified example of the electrochemical reaction device in the first embodiment.

Further, as illustrated in FIG. 2, a first pressure regulator 141 is arranged on the back pressure side of the first accommodation pan 3 and a second pressure regulator 142 may be additionally arranged on the back pressure side of the second accommodation part 5. The second pressure regulator 142 is provided at the second gas and liquid discharge flow path 20. The provision of the second pressure regulator 142 enables regulation of the differential pressure between the first accommodation part 3 and the second accommodation part 5. This can suppress breakage of the like of the diaphragm 6 due to the differential pressure between the first accommodation part 3 and the second accommodation part 5. The difference between the pressure in the first accommodation part 3 and the pressure in the second accommodation part 5 (differential pressure) is preferably set to 0.5 MPa or less.

The regulation of the pressure in the first accommodation part 3 by the pressure regulator 14 is performed by sending a detection signal, which represents at least one of the amount and the kind of the substance produced at the reduction electrode 8, detected by the reaction product detector 15 to the controller 16 and controlling the operation of the pressure regulator 14 by the controller 16. The reaction product detector 15 is not limited to an analyzer that performs gas analysis or liquid analysis on the substance produced in the first accommodation part 3, but an electrode potential monitor that monitors the potential of the reduction electrode 8, a voltage and current monitor that monitors at least one of the voltage and the current of the reduction electrode 8 and the oxidation electrode 9, or the like can be used. The reaction product detector 15 is electrically connected to the controller 16, and the controller 16 is electrically connected to the pressure regulator 14. The reaction product detector 15 outputs a signal based on the detection result to the controller 16.

The reaction product detector 15 illustrated in FIG. 1 includes an electrode potential monitor that monitors the potential of the reduction electrode 8 through a reference electrode 21. Since the electrode potential of the reduction electrode 8 is one of factors that decide the amount of current and the Faradaic efficiency of the product, the amount and the composition of the substance produced from the reduction electrode 8 can be recognized by monitoring the electrode potential. In the case of monitoring the electrode potential of the reduction electrode 8, the reference electrode 21 is arranged in the first accommodation pan 3 as illustrated in FIG. 1. The reaction product detector 15 is connected to the reference electrode 21. The reference electrode 21 may be the one made of any material as long as it is made of a material usable as an electrode material such as platinum, gold, silver, copper, SUS, carbon or the likes. It is also possible to use a reference electrode 21 used for electrochemistry measurement, such as a silver-silver chloride electrode, a calomel electrode, a mercury-mercury oxide electrode or the like.

An electrochemical reaction device 1A illustrated in FIG. 2 includes, as the reaction product detector 15, an analyzer that performs at least one of gas analysis and liquid analysis. The reaction product detector 15 being the analyzer is arranged on the discharge side of the first product separator 12 and directly analyzes the production amount and the composition of the reduction reaction product from gas and liquid being the separated substance. The analyzer as the reaction product detector 15 is composed of an apparatus such as a gas chromatography, a high-performance liquid chromatography, or an ion chromatography capable of analyzing hydrocarbon in gas and liquid. The detection signal of the production amount and the composition of the reduction reaction product detected by the analyzer is sent to the controller 16 to thereby control the operation of the pressure regulator 14. Note that in the case where the reaction product detector 15 detects the product by monitoring the electrode potential of the reduction electrode 8 and the voltage and current (cell voltage and current) of the electrochemical reaction cell, the composition and the amount of the product can be recognized indirectly from the electrode potential or the cell voltage and current by investigating in advance the relation (dependence) between the composition and the amount of the product, and, the electrode potential or the cell voltage and current. As illustrated in a later-described second embodiment, in the case of monitoring the cell voltage, the reaction product detector 15 is a signal outputting-type voltmeter connected to the cell in parallel. In the case of monitoring the cell current, the reaction product detector 15 is a signal outputting-type ammeter connected to the cell in series. The reaction product detector 15 may have a form incorporated in the power supply 11.

The controller 16 is electrically connected to the pressure regulator 14 and the reaction product detector 15. The controller 16 receives the detection signal (data signal) from the reaction product detector 15 and outputs a control signal to the pressure regulator 14. The controller 16 stores in advance a request criterion of live data signal relating to the composition and the amount of the product, so that when the request criterion is not satisfied, the controller 16 outputs the control signal to the pressure regulator 14. The controller 16 is composed of a computer such as a PC or a microcomputer, and arithmetically processes the data signal from the reaction product detector 15 and controls the operation of the pressure regulator 14 so that the potential of the reduction electrode 8 becomes a predetermined potential, thereby regulating the internal pressure of the first accommodation part 3.

Next, the operation of the electrochemical reaction device 1A will be described. Here, a case of using water and an aqueous solution containing carbon dioxide as the electrolytic solutions 2, 4 to reduce carbon dioxide to mainly produce carbon monoxide will be described. When a voltage of an electrolysis voltage or higher is applied between the reduction electrode 8 and the oxidation electrode 9, the oxidation reaction of water ($H_2O$) occurs near the oxidation electrode 9 in contact with the second electrolytic solution 4. As expressed in the following Expression (1), the oxidation reaction of $H_2O$ contained in the second electrolytic solution 4 occurs, and electrons are lost and oxygen ($O_2$) and hydrogen ions ($H^+$) are produced. A part of the produced hydrogen ions ($H^+$) move through the diaphragm 6 into the first electrolytic solution 2.

$$2H_2O \rightarrow 4H^+ + O_2 + 4e^- \tag{1}$$

When the hydrogen ions ($H^+$) produced on the oxidation electrode 9 side reach the vicinity of the reduction electrode 8 and electrons ($e^-$) are supplied to the reduction electrode 8 from the power supply 11, the reduction reaction of carbon dioxide ($CO_2$) occurs. As expressed in the following Expression (2), $CO_2$ contained in the first electrolytic solution 2 is reduced by the hydrogen ions ($H^+$) moved to the vicinity of the reduction electrode 8 and the electrons ($e^-$) supplied from the power supply 11 to produce carbon monoxide (CO).

$$2CO_2 + 4H^+ + 4e^- \rightarrow 2CO + 2H_2O \tag{2}$$

Note that the reduction reaction of $CO_2$ is not limited to the CO production reaction but may be a production reaction of ethanol ($C_2H_5OH$), ethylene ($C_2H_4$), ethane ($C_2H_6$), methane ($CH_4$), methanol ($CH_3OH$), acetic acid ($CH_3COOH$), propanol ($C_3H_7OH$) or the like.

The reduction reaction by the reduction electrode 8 fluctuates depending on the potential applied to the reduction electrode 8. For example, there is a case where $H_2$ gas is produced by the reduction reaction of water in addition to the above-described production reaction of CO gas. The rate between production amounts of CO gas and $H_2$ gas fluctuates depending on the potential applied to the reduction electrode 8, and the amount of $H_2$ gas mixed in CO gas being the main target product may increase in some cases. Besides, the kind or the like of the reduction catalyst constituting the reduction electrode 8 is selected to make an organic compound such as ethanol, ethylene, or ethane the main target product, in place of CO gas in some cases. In such a case, the production amount of CO increases and the production amount of the organic compound decreases depending on the potential applied to the reduction electrode 8. The fluctuations in composition and production amount of the reduction reaction product accompanying the above-described fluctuation in the applied voltage to the reduction electrode 8 are monitored by the reaction product detector 15. Then, the pressure regulator 14 is controlled based on the monitoring result by the reaction product detector 15, whereby the pressure in the first accommodation part 3 is regulated as described above. This adjusts the potential of the reduction electrode 8 to be a desired potential, and adjusts the composition and the production amount of the reduction reaction product to desired states. Accordingly, it becomes possible to suppress the successive fluctuations in production amount and composition of the reduction reaction product of $CO_2$ due to the change in the applied voltage to the reduction electrode 8 to thereby enhance the availability and utility value of the reduction reaction product.

Second Embodiment

Figure 3:
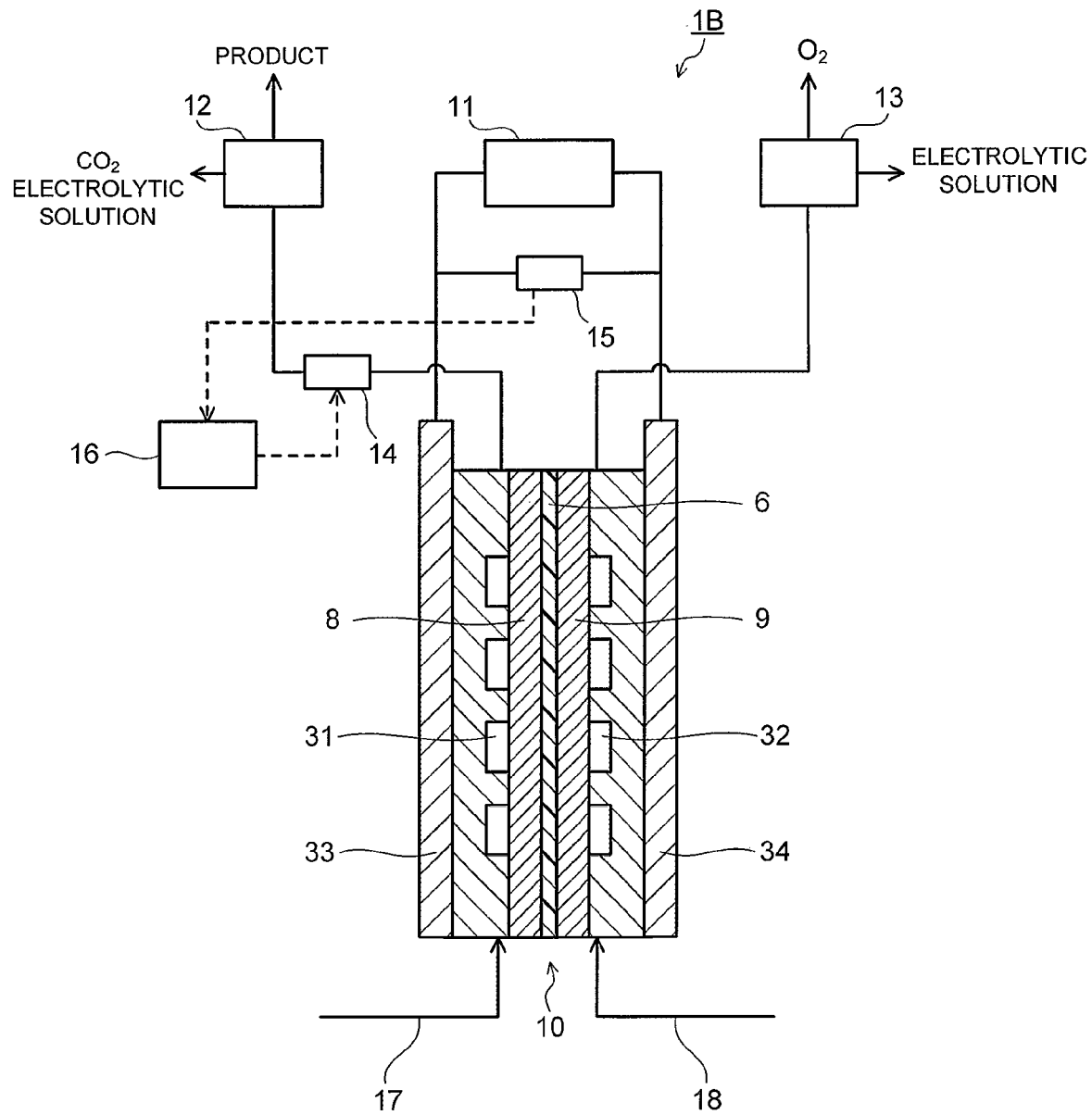
FIG. 3 is a diagram illustrating an electrochemical reaction device in a second embodiment.

Next, an electrochemical reaction device 1 in a second embodiment will be described referring to FIG. 3. An electrochemical reaction device 1B illustrated in FIG. 3 is different from the electrochemical reaction device 1A in the first embodiment in a contact type of gas containing $CO_2$ (simply described as $CO_2$ gas in some cases) or a first electrolytic solution (cathode solution) containing $CO_2$ with the reduction electrode 8, a contact type of a second electrolytic solution (anode solution) containing water with the oxidation electrode 9, and a connection type of the reduction electrode 8 and the oxidation electrode 9 with the power supply 11. The configurations of the units other than them, for example, the concrete configurations of the reduction electrode, the oxidation electrode, the diaphragm, the first electrolytic solution, the second electrolytic solution, the power supply and so on, the separation of the product, the detection of the product, the pressure regulation based on the detection result of the product and so on are the same as those in the first embodiment. Note that gas containing $CO_2$ can be used in place of the first electrolytic solution containing $CO_2$ in the second embodiment.

The electrochemical reaction device 1B according to the second embodiment illustrated in FIG. 3 includes an electrochemical reaction cell 10 including a reduction electrode 8, an oxidation electrode 9, a diaphragm 6, a first flow path 31 for allowing gas containing $CO_2$ (simply described as $CO_2$ gas in some cases) or a first electrolytic solution (cathode solution) containing $CO_2$ to flow therethrough, a second flow path 32 for allowing a second electrolytic solution (anode solution) containing water to flow therethrough, a first current collector plate 33 electrically connected to the reduction electrode 8, and a second current collector plate 34 electrically connected to the oxidation electrode 9. The first and second current collector plates 33, 34 of the electrochemical reaction cell 10 are connected to the power supply 11. Between the electrochemical reaction cell 10 and the power supply 11, a voltmeter for monitoring the cell voltage is connected as a reaction product detector 15. The reaction product detector 15 may be an ammeter for monitoring the cell current, or the potential detection monitor or analyzer mentioned in the first embodiment.

The first flow path 31 is arranged to face the reduction electrode 8. To the first flow path 31, not-illustrated gas or solution tank, pump and so on are connected and configured such that the $CO_2$ gas or cathode solution flows through the first flow path 31 and comes into contact with the reduction electrode 8. The $CO_2$ in the $CO_2$ gas or cathode solution passed through the reduction electrode 8 is reduced by the reduction electrode 8. A gas or solution containing the reduction reaction product of $CO_2$ is sent to the first product separator 12. Between the first flow path 31 and the first product separator 12, a pressure regulator 14 is provided. The second flow path 32 is arranged to face the oxidation electrode 9. To the second flow path 32, not-illustrated solution tank, pump and so on are connected and configured such that the anode solution flows through the second flow path 32 and comes into contact with the oxidation electrode 9. The $H_2O$ in the anode solution passed through the oxidation electrode 9 is oxidized by the oxidation electrode 9. A solution containing the oxidation reaction product of $H_2O$ is sent to the second product separator 13.

In the electrochemical reaction device 1B in the second embodiment, the reaction product detector 15 monitors the cell current and thereby detects the composition and the amount of the reduction reaction product. In this case, the composition and the amount of the product can be recognized indirectly from the cell voltage and current by investigating in advance the relation (dependence) between the composition and the amount of the product, and, the cell voltage and current. The pressure regulator 14 is controlled based on the monitoring result by the reaction product detector 15, whereby the pressure in the first flow path 31 is regulated. This adjusts the potential of the reduction electrode 8 to be a desired potential, and adjusts the composition and the production amount of the reduction reaction product to desired states. Accordingly, it becomes possible to suppress the successive fluctuations in production amount and composition of the reduction reaction product of $CO_2$ due to the change in the applied voltage to the reduction electrode 8 to thereby enhance the availability and utility value of the reduction reaction product.

EXAMPLES

Next, examples and their evaluation results will be described.

Example 1

The electrochemical reaction device 1A having the configuration illustrated in FIG. 1 was manufactured. First, the electrochemical reaction device 1A was used to control the pressure in the first accommodation part 3 to thereby carry out verification whether the potential of the reduction electrode 8 was controllable. In this verification experiment, the controller 16 was not operated, but the reading of the product by the reaction product detector 15 and the operation of the pressure regulator 14 were manually operated.

As the electrochemical reaction cell, an acrylic reaction container was used. At the middle of the reaction container, an anion exchange membrane was arranged to separate the reaction container into two chambers of a first accommodation part and a second accommodation part. As the reduction electrode, the one obtained by Au plating on carbon paper was used. As the oxidation electrode, nickel mesh was used. For the first and second electrolytic solutions, a 0.5 M $KHCO_3$ aqueous solution was used. As the reference electrode, Ag/AgCl (3M NaCl) was used and inserted into the first accommodation part. Further, $CO_2$ was supplied to the first accommodation part, and $CO_2$ was supplementarily supplied to the second accommodation part. For the power supply, a DC stabilized power supply was used for a verification experiment, and was connected to the reduction electrode and the oxidation electrode. For the reaction product detector for the product, a data logger capable of recording voltage was used. For the pressure regulator, a relief valve was used.

The potential dependence of the Faradaic efficiency of the product produced in the reduction reaction of $CO_2$ was evaluated in advance by a three-electrode system measurement using a potentiostat. The gas components discharged from the reduction electrode side were analyzed by a gas chromatography apparatus. The gas components observed by the gas chromatography apparatus were CO, $H_2$, and $CO_2$. Then, the Faradaic efficiency over time of CO of the $CO_2$ reduced substance produced at the reduction electrode was calculated. The CO Faradaic efficiency was calculated from the following expression. Note that the CO production rate from the gas chromatography analysis result was used, and the value observed by the ammeter was used as the current value. Besides, the number of reaction electrons was set to 2.

[Mathemiatical Expression 1]

$$\text{CO FARADAIC EFFICIENCY } [\%] = \frac{\text{CO PRODUCTION RATE [mol/s]} \times \text{FARADAY CONSTANT} \times \text{NUMBER OF REACTION ELECTRONS}}{\text{CURRENT VALUE } [A]}$$

Figure 4:
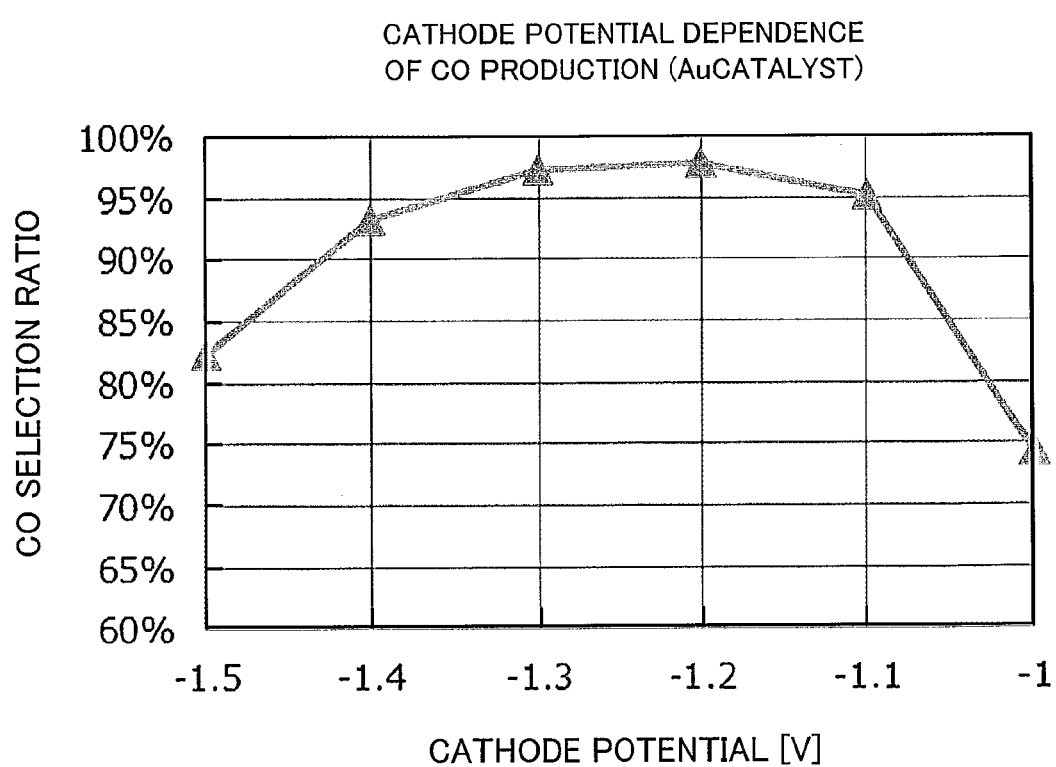
FIG. 4 is a chart illustrating a relation between a cathode potential and a CO selection ratio in an electrochemical reaction device in Example 1.
Figure 5:
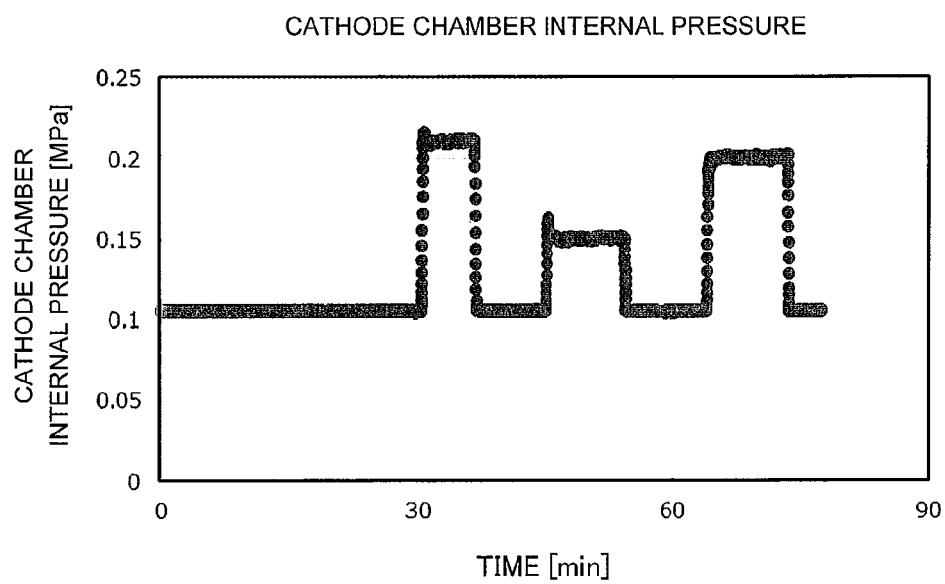
FIG. 5 is a chart illustrating an example of temporal change in pressure in a cathode chamber in the electrochemical reaction device in Example 1.
Figure 6:
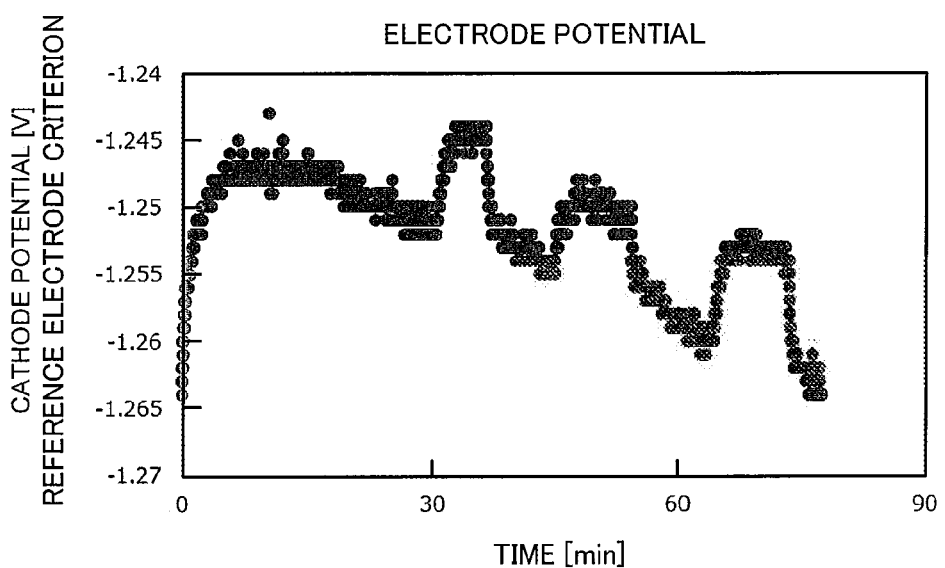
FIG. 6 is a chart illustrating an example of temporal change in cathode potential in the electrochemical reaction device in Example 1.

The result is illustrated in FIG. 4. FIG. 4 shows that the Faradaic efficiency of CO being the reduced substance of $CO_2$ has potential dependence and reaches the maximum value near an electrode potential of −1.2 to −1.3 V. Next, whether the potential of the reduction electrode was controllable by controlling the pressure in the first accommodation part was verified. As an operation method, the relief valve being the pressure regulator was arbitrarily throttled with a voltage of 3.0 V applied to the cell, and the change in the reduction electrode potential at that time was observed. The results are illustrated in FIG. 5 and FIG. 6. FIG. 5 is a graph obtained by monitoring the pressure in the first accommodation part (cathode chamber) by the pressure sensor, and FIG. 6 illustrates the potential of the reduction electrode recorded on the data logger being the product detection unit. It is found from FIG. 5 and FIG. 6 that with an increase in pressure in the first accommodation part (cathode chamber), the electrode potential increases in response to the change in pressure.

From the above verification result, it was finally verified that the electrode potential of the reduction electrode was able to be changed by controlling the pressure in the first accommodation part in which the reduction electrode was arranged. The potential of the reduction electrode is a factor of deciding the amount and the composition of the product, and therefore can suppress the fluctuations in production amount and composition of the $CO_2$ reduced substance so as to stably reduce $CO_2$ for a long period.

Based on the above result, a power supply derived from the renewable energy was used as the power supply, and a reduction test of $CO_2$ was carried out. In this event, the amount and the composition of the product at the reduction electrode were visually checked by the potential monitor operated as the reaction product detector, and a detection signal thereof was sent to the controller so as to control the pressure regulator. As a result, though there was a fluctuation in potential applied to the reduction electrode from the power supply derived from the renewable energy, it was confirmed that the mount and the composition of the product at the reduction electrode were suppressed in fluctuation based on the regulation of the pressure in the first accommodation part.

Note that the above-described configurations in the embodiments are applicable in combination, and parts thereof are also replaceable. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrochemical reaction method, comprising:
    supplying gas containing carbon dioxide to a gas supply flow path connected to an inlet port of a first flow path in an electrochemical reaction cell so that the gas is in contact with a reduction electrode, and supplying an electrolytic solution containing water to a liquid supply flow path connected to an inlet port of a second flow path in the electrochemical reaction cell so that the electrolytic solution is in contact with an oxidation electrode, wherein the electrochemical reaction cell comprises the reduction electrode, the oxidation electrode, the first flow path arranged to face the reduction electrode, the second flow path arranged to face the oxidation electrode, and a diaphragm provided between the reduction electrode and the oxidation electrode;
    applying a voltage from a power supply connected to the reduction electrode and the oxidation electrode, to reduce carbon dioxide and thus produce a carbon compound, and to oxidize water and thus produce oxygen;
    discharging the carbon compound from a first gas and liquid discharge flow path connected to an outlet port of the first flow path, and oxygen from a second gas and liquid discharge flow path connected to an outlet port of the second flow path;
    detecting continuously at least one of a voltage value and a current value of a current flowing between the reduction electrode and the oxidation electrode to obtain a detection signal indicating an amount and a kind of a substance produced at the reduction electrode; and
    regulating a pressure in the first flow path of the electrochemical reaction cell by a first pressure regulator provided in the first gas and liquid discharge flow path based on the detection signal to control the amount and the kind of the substance produced at the reduction electrode so that the pressure in the first flow path becomes 0.1 MPa or more and 6.4 MPa or less when the detection signal does not satisfy a request criterion.

2. The method according to claim 1, further comprising:
    regulating a pressure in the second flow path of the electrochemical reaction cell by a second pressure regulator provided in the second gas and liquid discharge flow path so that a difference between the pressure in the first flow path and the pressure in the second flow path becomes 0.5 MPa or less.

3. The method according to claim 1, wherein
    the power supply comprises a power source which converts kinetic energy or potential energy to electric energy, a power source which converts light energy to electric energy, a power source which converts chemical energy to electric energy, or a power source which converts vibrational energy to electric energy.

4. The method according to claim 1, wherein
    the pressure in the first flow path of the electrochemical reaction cell is regulated to stabilize the amount and the kind of the substance produced at the reduction electrode.

5. The method according to claim 3, wherein
the pressure in the first flow path of the electrochemical reaction cell is regulated to control the amount and the kind of the substance produced at the reduction electrode when the applied voltage from the power supply fluctuates.

6. The method according to claim 1, wherein
the pressure regulating comprises comparing the detection signal against the request criterion stored in a storage part, determining whether the detection signal satisfies the request criterion, and outputting a control signal to the first pressure regulator to control the amount and the kind of the substance produced at the reduction electrode when the detection signal does not satisfy the request criterion.

7. The method according to claim 1, wherein
the detection signal further includes a result of an analysis the substance produced at the reduction electrode.

8. The method according to claim 1, wherein
the detection signal further includes a potential of the reduction electrode.

9. The method according to claim 8, wherein
the reduction electrode contains Au as a reduction catalyst, and
the pressure in the first flow path is regulated by the first pressure regulator so that the potential of the reduction electrode becomes in a range of −1.4 V or more and −1.1 V or less on a basis of a reference electrode including Ag/AgCl (3M NaCl).

10. The method according to claim 1, wherein
the request criterion is decided by a relation between the amount and the kind of the substance produced at the reduction electrode and at least one of the voltage value and the current value of the current flowing between the reduction electrode and the oxidation electrode.

* * * * *